UNITED STATES PATENT OFFICE 2,648,015

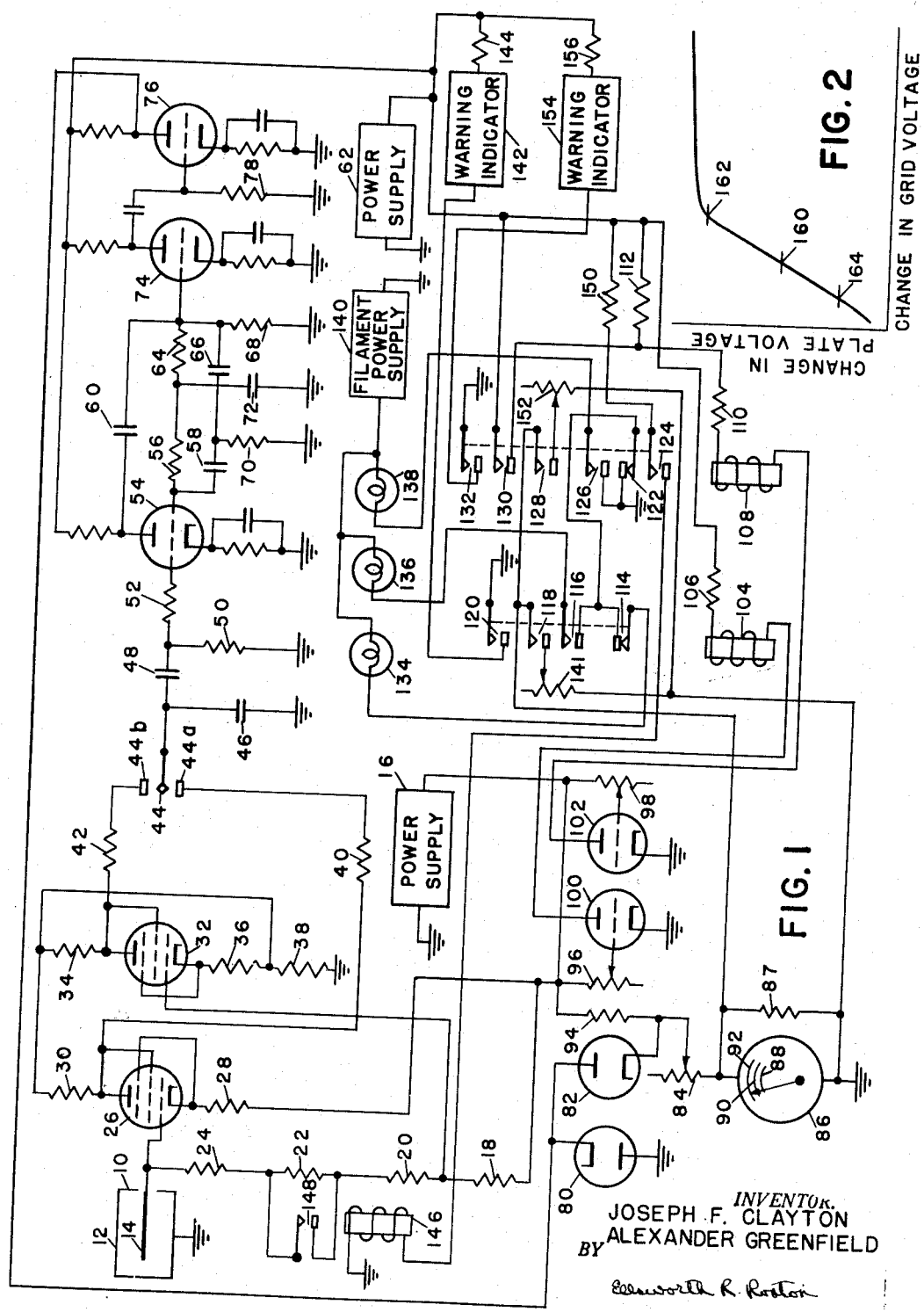

SYSTEM FOR MEASURING RADIOACTIVITY

Alexander Greenfield and Joseph F. Clayton, Detroit, Mich., assignors to Bendix Aviation Corporation, Detroit, Mich., a corporation of Delaware Application May 31, 1951, Serial No. 229,228

9 Claims. (Cl. 250—83.6)

This invention relates to a system for measuring the intensity of radioactivity and more particularly to a system for accurately measuring the intensity of radioactivity over a wide range of values.

In recent years, much research and developmental work has been performed in attempting to harness atomic energy for peace and war. As a result of this work, many new developments involving principles of atomic energy have been successfully completed. In addition to their own success, these developments appear to offer vast potentialities for uses, both civilian and military, to which the principles of atomic energy may be put in the future.

The great potentialities for uses of atomic energy have presented an urgent need for apparatus which will instantaneously and accurately measure the intensity of radioactivity over a wide range of values. In addition to being accurate, the apparatus should be portable to insure its widespread use in such civilian functions as the home, office or factory and in such military functions as ships or airplanes. The apparatus should also be relatively inexpensive to bring it within the financial reach of the average citizen, and the apparatus should be capable of operating for long periods of time with a minimum amount of calibration and repair. In spite of the obvious need for such apparatus and the considerable effort devoted to its development, the severe requirements imposed upon it have until now prevented an entirely satisfactory apparatus from being developed.

This invention provides a system for measuring the intensity of radioactivity by producing a direct current proportional to the intensity of radioactivity and converting the current into a proportionate direct voltage. The system then converts the direct voltage into a proportionate alternating voltage for amplification. By amplifying an alternating voltage instead of a direct voltage, an increase in the amplification can be obtained with a simultaneous increase in stability and a simplification in construction. The increase in amplification and stability facilitates an accurate indication of the intensity of radioactivity, and the simplification of construction furthers the objectives of a relatively light weight and inexpensive price.

An object of this invention is to provide a system for accurately and instantaneously indicating the intensity of radioactivity over a wide range of values.

Another object is to provide a system of the above character for indicating the general level of radioactivity present in a given locality so that the danger from the radiations can be quickly ascertained.

A further object is to provide a system of the above character having a stable and reliable response to radioactivities of different intensity.

Still another object is to provide a system of the above character which is relatively light in weight and inexpensive in price, so that it is available for widespread use by the average citizen.

Other objects and advantages will be apparent from a detailed description of the invention and from the appended drawings and claims:

In the drawings:

Figure 1 is a circuit diagram of a system for measuring the intensity of radioactivity; and Figure 2 is a curve illustrating the response characteristics of one of the tubes shown in Figure 1.

In the system shown in Figure 1, an ionization chamber 10 is provided having a conductive cylindrical wall 12 and a rod 14 axially disposed within the cylinder 12 in insulated relationship to the cylinder. A suitable gas, such as argon, is retained under pressure within the cylinder 12, which is grounded. A negative voltage of 150 volts is applied from a power supply 16 to the rod 14 through resistances 18, 20, 22 and 24 in series, the resistances 22 and 24 being in the order of 30,000 and 10,000 megohms, respectively, and the resistances 18 and 20 being in the order of 1 megohm or less.

The rod 14 is also connected to the control grid of a pentode 26 having its cathode and suppressor grid connected through a resistance 28 to the power supply 16. The plate and screen grid of the tube 26 are connected to one side of a resistance 30. In like manner, connections are made from the plate and screen grid of a pentode 32 to one side of a resistance 34 substantially equal to the resistance 30. The control grid of the tube 32 is connected to the common terminal between the resistances 18 and 20 and the cathode and screen grid are connected through resistances 36 and 38 to ground. The common terminal between the resistances 36 and 38 is connected to the other side of the resistances 30 and 34.

The plates of the tubes 26 and 32 are also connected through substantially equal resistances 40 and 42 to stationary contacts 44a and 44b, respectively, of a vibrator 44. The movable contact of the vibrator 44 is mechanically driven into engagement with the contacts 44a and 44b at a substantially constant speed, such as 120 cycles per second. Electrical connections are made from the movable contact of the vibrator 44 to a grounded capacitance 46 and to a capacitance 48 which is in turn connected to a grounded resistance 50 and a resistance 52.

The grid of a triode 54 is connected to the resistance 52 and to a resistance 56 and capacitance 58. The cathode of the tube 54 is connected to a resistance in parallel with a by-pass capacitance, and the plate is connected to a capacitance 60 and through a suitable resistance to a power supply 62 adapted to supply positive voltage. Connections are made from the capacitance 60 to a resistance 64 in series with the resistance 56, to a capacitance 66 in series with the capacitance 58 and to a grounded resistance 68. A grounded resistance 70 is connected to the common terminal between the capacitances 58 and 66, and a capacitance 72 is connected to the common terminal between the resistances 56 and 64.

A connection is made from the common terminal between the resistance 64 and capacitance 66 to the grid of a tube 74 having its cathode connected to ground through a suitable cathode resistance in parallel with a by-pass capacitance. Voltage from the power supply 62 is applied to the plate of the tube 74 through a suitable resistance. The plate of the tube 74 is also connected through a suitable coupling capacitance to the grid of a tube 76 and to a grounded bias resistance 78. The cathode of the tube 76 is grounded through a suitable resistance and by-pass capacitance in parallel, and the plate has voltage applied to it from the power supply 62 through a suitable resistance.

The plate of the tube 76 is connected to the cathode of a rectifier tube 80 having a grounded plate and to the plate of a second rectifier tube 82. The cathode of the tube 82 is connected to the movable contact of a potentiometer 84, a stationary contact of which is connected to one terminal of an indicator 86 having its other terminal grounded. A resistance 87 is in parallel with the indicator 86. The indicator has a plurality of scales 88, 90, and 92 each adapted to point out the intensity of radioactivity over a different range of values. For example, the scale 88 may have a range of 0–5 milliroentgens per hour, the scale 90 a range of 0–50 milliroentgens per hour and the scale 92 a range of 0–2000 milliroentgens per hour. To differentiate between the scales, the scale 88 may be provided with white numerals, the scale 90 with green numerals and the scale 92 with red numerals.

A connection from the cathode of the rectifier tube 82 is made to one side of a resistance 94, the other side of which is connected to the power supply 16 and to a stationary contact of potentiometers 96 and 98. The movable contacts of the potentiometers 96 and 98 are connected to the control grids of tubes 100 and 102, respectively, having grounded cathodes. The plate of the tube 100 is connected to one side of a solenoid 104, the other side of which has voltage from the power supply 62 applied to it through a resistance 106. In like manner, the plate of the tube 102 is in series with a solenoid 108, resistances 110 and 112 and the power supply 62.

A normally closed switch 114 and normally open switches 116, 118 and 120 are associated with the solenoid 104, and a normally closed switch 122 and normally open switches 124, 126, 128, 130 and 132 are associated with the solenoid 108. The movable contact of the switch 114 is connected to one terminal of a bulb 134, the other terminal of which is connected to corresponding terminals of bulbs 136 and 138 and to a grounded filament power supply 140. The bulbs 134, 136 and 138 are adapted to cast colored illuminations on the face of the indicator 86 corresponding to the colors of the scales 88, 90 and 92, respectively.

The stationary contact of the switch 114 is connected to the stationary contact of the switch 116 and to the movable contact of the switch 122, the stationary contact of which is grounded. The movable contact of the switch 116 is connected to a terminal of the bulb 136. Connections are made from the movable contact of the switch 118 to the movable contact of the switch 128 and to the ungrounded side of the indicator 86 and from the stationary contact of the switch 118 to the movable contact of a potentiometer 141, a stationary contact of which is grounded. The movable contact of the switch 120 is grounded and the stationary contact is connected to one terminal of a warning indicator 142, the other terminal of which has voltage from the power supply 62 applied to it through a resistance 144.

The stationary contact of the switch 124 is connected to a grounded solenoid 146, which actuates a normally open switch 148 connected across the resistance 22. Voltage from the power supply 62 is applied through a resistance 150 to the movable contact of the switch 124. The stationary contact of the switch 126 is grounded and the movable contact is connected to a terminal of the bulb 138. Connections are made from the stationary contact of the switch 128 to the movable contact of a potentiometer 152 having a grounded stationary contact and from the stationary contact of the switch 130 to the common terminal between the resistances 110 and 112. The movable contact of the switch 130 has voltage applied to it from the power supply 62 and the movable contact of the switch 132 is grounded. The stationary contact of the switch 132 is connected to one terminal of the warning indicator 154, the other terminal of which is connected through a resistance 156 to the power supply 62.

Radioactive emanations, such as gamma photons, penetrate the ionization chamber and liberate electrons from the inner wall of the cylinder 12, which is made from a suitable material such as copper having a high electron density. The electrons travel from the cylindrical wall into the ionization chamber and then return to the wall because of the positive voltage on the wall relative to the voltage on the rod 14. During their cyclic movement, some of the electrons strike the argon molecules within the cylinder with sufficient force to produce ionization of the molecules into electrons and positive ions. The positive ions are attracted towards the rod 14 and the negative ions towards the cylinder 12 to produce an electrical current proportional to the intensity of radioactivity.

The electrical current produced by the ionization of argon molecules flows through the resistances 22 and 24 and produces a voltage drop across the resistances. The voltage drop across the resistances 22 and 24 causes the voltage on the grid of the tube 26 to rise and the current through the tube to increase. The current through the tube 26 is normally equal to the current through the tube 32 for a condition of no radioactivity, since the voltages on corresponding elements of the two tubes are substantially equal and the tubes are preselected to have substantially identical response characteristics. As illustrated at 160 in Figure 2, the operating characteristics of the tubes 26 and 32 are in the linear region of tube response when no radioactivity is present.

Since the tube 26 is operating in its region of linear response and since the change in grid voltage is proportional to the intensity of radioactivity, the increase in current flowing through the tube when radioactivity is present is proportional to the intensity of radioactivity, and this current produces a voltage drop on the plate of the tube. The change in voltage on the plate of the tube 26 causes a voltage difference proportional to the intensity of radioactivity to be produced between the plate of this tube and the plate of the tube 30. This voltage difference appears between the terminals 44a and 44b of the vibrator 44.

As previously disclosed, the movable contact of the vibrator 44 is mechanically driven between the two contacts 44a and 44b of the vibrator at a constant speed such as 120 cycles per second. When a voltage difference exists between the stationary contacts, an alternating voltage is produced having an amplitude proportional to this difference. The alternating voltage has a fundamental frequency of 120 cycles per second and harmonic frequencies which are multiples of the basic frequency. The harmonic frequencies produced by the vibrator 44 are considerably reduced in amplitude by the filter network including the capacitances 46 and 48 and the resistances 50 and 52 to produce a resultant signal whose characteristic resembles a sinusoidal wave having a frequency of 120 cycles per second. This signal is amplified by the tube 54.

The amplified signal from the tube 54 passes into a band-pass filter formed by the two T-networks. One T-network, including the capacitances 58 and 66 and the resistance 70, materially reduces the amplitude of signals having a frequency less than 120 cycles per second by feeding the signals back through the capacitance 60 to the tube 54 in a phase relationship which is opposed to the phase of the signals as they are originally introduced to the tube. Signals having a frequency less than 120 cycles per second are produced by a chatter in the movable contact of the vibrator 44. In like manner, the other T-network, which includes the resistances 56 and 64 and the capacitance 72, materially reduces the amplitude of the signals having a frequency above 120 cycles per second. The signal of 120 cycles per second is the only signal not fed back to the tube 54 and this signal is substantially the only signal introduced to the tubes 74 and 76 for further amplification.

By converting the direct voltage into an alternating voltage, a voltage gain of approximately 500 times the amplitude of the signal from the vibrator 44 is provided in the three stages consisting of the tubes 54, 74 and 76. Such a high voltage gain is important since the direct voltage produced across the resistances 22 and 24 is generally less than a millivolt in spite of the approximately 40,000 megohms provided by the resistances. The voltage gain is especially important since it is obtained with a minimum number of components and with a maximum amount of stability and reliability in the operation of the amplifiers.

The alternating voltage on the plate of the tube 76 is rectified by the tubes 80 and 82 and applied as a direct voltage to the movable contact of the potentiometer 84. A direct current proportional to the direct voltage than flows through a circuit which includes the power supply 62, the plate resistance for the tube 76, the rectifier tube 82, the potentiometer 84 and the indicator 86. This current provides a direct indication of the intensity of radioactivity on one of the scales 88, 90 and 92, as will be disclosed in detail hereafter.

The voltage on the movable contact of the potentiometer 84 is also applied through the resistance 94 to the grid of the normally cut-off tube 100. When the voltage reaches a value which provides a reading on the indicator corresponding to the maximum range of the scale 88, the tube 100 starts to conduct and current flows through a circuit which includes the power supply 62, the resistance 106, the solenoid 104, and the tube 100. This curent energizes the solenoid 104, which opens the switch 114 and closes the switches 116, 118 and 120. Thus, by varying the movable contact of the potentiometer 84, the calibrations of the indicator 86 and the tube 100 are simultaneously adjusted so that the tube will start to conduct when the pointer on the indicator 86 is at the maximum range of the scale 88. The calibration of the tube 100 may also be independently adjusted by varying the movable contact of the potentiometer 96.

The opening of the switch 114 causes the illumination of the bulb 134 to be discontinued, since the bulb is energized through a circuit which includes the power supply 140, the bulb 134, the switch 114 and the switch 122. At the same time, the closure of the switch 116 causes the bulb 136 to be illuminated by current which flows through the power supply 140, the bulb 136, the switch 116 and the switch 122. Illumination of the bulb 136 casts a green light on the face of the indicator 86 to make apparent to any person reading the measurement that the scale 90 should be used.

Since the scale 90 has a greater range than the scale 88, the sensitivity of the indicator is reduced by placing the potentiometer 141 in parallel with the resistance 87 and the indicator when the switch 118 closes. In addition, an external warning is provided through a circuit which includes the power supply 62, the resistance 144, the warning indicator 142 and the switch 120. The warning indicator 142 may be located in the same room as the indicator 86 or at a remote place relative to the indicator to provide either a distinctive audible or visual warning.

When the pointer on the indicator 86 reaches the end of the scale 90, the voltage on the movable contact of the potentiometer 98 causes the normally non-conductive tube 102 to start conducting. Current then flows through a circuit which includes the power supply 62, the resistances 112 and 110, the solenoid 108 and the tube 102. This current energizes the solenoid 108 and causes the switch 122 to open and the switches 124, 126, 128, 130 and 132 to close. Closure of the switch 124 produces a continuous circuit through the power supply 62, the resistance 150, the switch and the solenoid 146. This in turn causes the switch 148 to close and the resistance 22, which has a value of approximately 30,000 megohms, to be shorted.

The resistance 22 is shorted at the time that the tube 26 is starting to operate in a region of non-linear response, as indicated at 162 in Figure 2. By shorting the resistance, the sensitivity of the response of the tube to changes in current from the ionization chamber 10 is considerably reduced. This causes the tube to operate in a region of response near the bottom of the linear region, as indicated at 164 in Figure 2. Thus, by shorting the resistance 22, the range of linear response of the system shown in Figure 1 is materially increased. In order to provide for the continuation of the current through the solenoid 108 when the sensitivity of the tube 26 is decreased, the resistance 112 is shorted by the switch 130. This increases the sensitivity of the tube 102 to compensate for the decrease in sensitivity of the tube 26. Since the level of response 164 of the tube 26 is below the level 160 at which the solenoid 104 is energized, the switches 116 and 120 controlling the illumination of the bulb 136 and the operation of the warning indicator 142, respectively, are opened.

Upon the closure of the switch 126, the bulb 138 is illuminated by current which flows through a circuit including the filament power supply 140, the bulb 138 and the switch 126. Illumination of the bulb 138 causes a red light to be cast upon the face of the indicator 86 to instantaneously point out that the scale 92 should be read. The sensitivity of the indicator is decreased sufficiently by the potentiometer 152, which is connected in parallel with the indicator 86 and the resistance 87 when the switch 128 closes. The potentiometer 152 has an effective resistance which is considerably less than the resistance 87 and somewhat less than the potentiometer 141. The switch 132 also closes and provides a continuous circuit which includes the power supply 62, the resistance 156, the warning indicator 154 and the switch. The warning indicator 154 then operates to provide a distinctive warning that the intensity of radio-activity is approaching a level of considerable danger.

The system disclosed above has several important advantages. It initially determines the intensity of radioactivity by providing a direct voltage to serve as a reference level and by varying a second voltage from the reference level by an amount proportional to the intensity of radioactivity. Comparing the variable voltage with a reference level considerably reduces any errors which may occur in the initial stages of the system. The system operates to provide substantially linear changes in the variable voltage with changes in the intensity of radioactivity. When the voltage variations become non-linear because of increases in the intensity of radioactivity, the system operates to decrease its sensitivity so as again to provide linear voltage variations. In this way, the range of linear response of the system is considerably increased.

By converting the difference between the reference and variable voltages into a proportionate alternating voltage and then amplifying the alternating voltage, increased gain and stability are obtained. Because of the increased gain, the indicator 86 is able to measure in volts instead of millivolts and is thus unaffected by any millivolt variations that may occur. The use of A. C. amplifiers also eliminates any need for fine adjustments in the amplifier stages to obtain a stable output and at the same time simplifies the circuitry of these stages. Since the A. C. amplifiers are relatively stable, they are not unduly sensitive to any temperature variations that may occur.

The system also provides as indicator having a plurality of scales as well as a switching circuit for varying the sensitivity of the indicator in accordance with the range of the scale to be read and for simultaneously providing an instantaneous indication of the scale to be read. A single control, such as the potentiometer 84, is provided to adjust the sensitivity of the indicator and the sensitivity in the operation of the switching circuit, so that the operation of the switching circuit will be properly coordinated with indications at the end of the different scales.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A system for measuring the intensity of radioactivity, including, an ionization chamber for converting the radioactivity into a proportionate electrical circuit, a pair of tubes normally balanced to provide direct output voltages of substantially equal magnitudes, means for unbalancing the output voltage from one of the tubes in accordance with the value of the electrical current, means for converting the difference in the output voltages from the two tubes into an alternating voltage proportionate to the voltage difference, means for amplifying the alternating voltage, and means for providing an indication in accordance with the value of the amplified alternating voltage.

2. A system for measuring the intensity of radioactivity, including, an ionization chamber for producing an electrical current proportional to the intensity of radioactivity, reference means for providing a pair of direct voltages of equal value for a condition of no radioactivity, means for varying the voltages from one of the reference means in accordance with the electrical current produced by the radioactivity, means for converting the difference between the reference voltages into a proportionate alternating voltage, means for amplifying the alternate voltage, and means for providing an indication proportionate to the value of the alternating voltage.

3. A system for measuring the intensity of radioactivity, including, an ionization chamber for producing an electrical current proportionate to the intensity of radioactivity, a detector balanced for a condition of no radioactivity and adapted to provide a direct output voltage proportionate to the intensity of radioactivity, a converter for producing an alternating voltage having an amplitude proportionate to the direct voltage from the detector, an amplifier for the alternating voltage, and an indicator responsive to the amplitude of the voltage from the amplifier.

4. A system for measuring the intensity of radioactivity, including an ionization chamber for converting the radioactivity into a proportionate electrical current, means for converting the electrical current into a proportionate direct voltage, means for providing a direct reference voltage, means connected to the conversion means and to the reference means for producing a variation in voltage from the reference level proportional to the intensity of radioactivity, means for converting the voltage variation into an alternating voltage having an amplitude proportional to the voltage variation, means for amplifying the alternating voltage, and means for providing an indication in accordance with the amplitude of the amplified alternating voltage.

5. A system for measuring the intensity of radioactivity, including, an ionization chamber for producing a direct current proportional to the intensity of radioactivity, means for converting the direct current into a proportionate direct voltage, means for converting the direct voltage into a proportionate alternating voltage, means for amplifying the alternating voltage, an indicator having a plurality of scales, each scale being adapted to measure a progressively increasing range of radioactivity, a plurality of solenoids, means for normally preventing any current from flowing through the solenoids, means operative upon an indication at the end of each scale to energize a predetermined solenoid, means operative by the flow of current through each solenoid to reduce the sensitivity of the indicator in accordance with the increased range of the next scale to be read, means operative by the flow of current through each solenoid to reduce the sensitivity of the indicator in accordance with the increased range of each scale and to provide an instantaneous indication of the scale to be read, and variable means operative to simultaneously adjust the calibration of each indicator scale and the currents required to energize the solenoids.

6. A system for measuring the intensity of radioactivity, including, an ionization chamber for producing a direct current proportional to the intensity of radioactivity, means for converting the direct current into a proportionate direct voltage, means for converting the direct voltage into a proportionate alternating voltage, means for amplifying the alternating voltage, an indicator having a plurality of scales, each scale being adapted to measure a progressively increasing range of radioactivity, a plurality of solenoids, means for normally preventing any current from flowing through the solenoids, means operative upon an indication at the end of each scale to energize a predetermined solenoid, means operative by the flow of current through each solenoid to reduce the sensitivity of the indicator in accordance with the increased range of the next scale and to provide an instantaneous indication of the scale to be read, and variable means operative to simultaneously adjust the calibration of each indicator scale and the currents required to energize the solenoids.

7. A system for measuring the intensity of radioactivity, including, a first tube having a cathode, grid and plate, a second tube having a cathode, grid and plate, an ionization chamber for producing a direct current proportional to the intensity of radioactivity, means for biasing the grids of the first and second tubes with equal voltages relative to their cathodes for a condition of no radioactivity, a resistance connected to the ionization chamber and across the grid and cathode of the first tube to change the bias on the tube by an amount proportional to the intensity of radioactivity so as to produce a proportionate change in the output from the first tube relative to the output from the second tube, means for converting the difference in the output voltages from the two tubes into a proportionate alternating voltage, means for amplifying the alternating voltage, means for reconverting the amplified alternating voltage into a proportionate direct voltage, an indicator adapted to measure the reconverted direct voltage, a plurality of scales on the indicator, each scale having a different range, means for adjusting the sensitivity of the indicator to change from one scale to another scale having an increased range when the indication is at the end of the first scale, and means for indicating the scale to be read.

8. A system for measuring the intensity of radioactivity, including, a first tube having a cathode, grid and plate, a second tube having a cathode, grid and plate, an ionization chamber for producing a direct current proportionate to the intensity of radioactivity, a resistance connected to the ionization chamber to produce a direct voltage proportionate to the direct current, means for biasing the grids of the first and second tubes with equal voltages relative to their cathodes for a condition of no radioactivity, the resistance being connected between the grid and cathode of the first tube to provide between the first and second tubes an unbalance of direct voltage proportionate to the voltage across the resistance, means for converting the voltage unbalance into a proportionate alternating voltage, means for amplifying the alternating voltage, means for reconverting the amplified alternating voltage into a proportionate direct voltage, and means for indicating the value of the reconverted direct voltage.

9. A system for measuring the intensity of radioactivity, including, a first tube having a cathode, grid and plate, a second tube having a cathode, grid and plate, an ionization chamber for producing a direct current proportionate to the intensity of radioactivity, a resistance connected to the ionization chamber to produce a direct voltage proportionate to the direct current, means for biasing the grids of the first and second tubes with equal voltages relative to their cathodes for a condition of no radioactivity, the resistance being connected between the grid and cathode of the first tube to provide between the first and second tubes an unbalance of direct voltage proportionate to the voltage across the resistance, means for converting the voltage unbalance into a proportionate alternating voltage, means for amplifying the alternating voltage, means for reconverting the amplified alternating voltage into a proportionate direct voltage, an indicator for measuring the reconverted direct voltage, a plurality of scales on the indicator, each scale having a different range, a plurality of solenoids each associated with a different indicator scale, means for producing a current through each solenoid at a predetermined level of the reconverted direct voltage, and means operative by each solenoid to adjust the sensitivity of the indicator in accordance with the scale to be read.

ALEXANDER GREENFIELD.
JOSEPH F. CLAYTON.

References Cited in the file of this patent
UNITED STATES PATENTS

| Number | Name | Date |
|---|---|---|
| 2,181,728 | Greentree | Nov. 28, 1939 |
| 2,361,274 | Cravath et al. | Oct. 24, 1944 |
| 2,434,297 | Test et al. | Jan. 13, 1948 |
| 2,453,318 | Hartline | Nov. 9, 1948 |
| 2,470,224 | Scherbatskoy | May 17, 1949 |
| 2,487,058 | Krasnow et al. | Nov. 8, 1949 |
| 2,532,503 | Kennedy et al. | Dec. 5, 1950 |

OTHER REFERENCES

"A Pulse Analyser for Nuclear Physics"—Rev. of Sci. Inst., February 1947, vol. 18, #2, pages 90–100.